(12) United States Patent
Kim et al.

(10) Patent No.: US 8,005,220 B2
(45) Date of Patent: Aug. 23, 2011

(54) RF COMMUNICATION SYSTEM HAVING A CHAOTIC SIGNAL GENERATOR AND METHOD FOR GENERATING CHAOTIC SIGNAL

(75) Inventors: Young-hwan Kim, Hwaseong-si (KR);
Seong-soo Lee, Suwon-si (KR);
Jae-hyon Kim, Suwon-si (KR);
Sang-min Han, Hwaseong-si (KR);
Anton Laktushkin, Moscow (RU);
Elena Efremova, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1216 days.

(21) Appl. No.: 11/709,790

(22) Filed: Feb. 23, 2007

(65) Prior Publication Data
US 2007/0206795 A1    Sep. 6, 2007

(30) Foreign Application Priority Data

Feb. 24, 2006    (KR) .................. 10-2006-0018210

(51) Int. Cl.
*H04L 9/00* (2006.01)
*H04K 3/00* (2006.01)
(52) U.S. Cl. .................. 380/263; 331/107 G; 375/130
(58) Field of Classification Search .............. 380/263; 331/107 G, 115; 375/130, 135
See application file for complete search history.

(56) References Cited

U.S. PATENT DOCUMENTS 3,883,823 A * 5/1975 Grace ................. 331/107 C
5,291,555 A * 3/1994 Cuomo et al. ............. 380/263
2002/0154677 A1 10/2002 Occhipinti et al.

FOREIGN PATENT DOCUMENTS

| EP | 1304824 A1 | 4/2006 |
| KR | 1020010075830 A | 8/2001 |
| KR | 1020050087328 A | 8/2005 |

OTHER PUBLICATIONS

Young-Hwan Kim et al.; Working Group for Wireless Personal Area Networks (WPANs); Jan. 2005.
Mar. 2005; Baseline Specification; Working Group for Wireless Personal Area Networks (WPANs).
Examination Report issued by the United Kingdom Patent Office for United Kingdom Patent Application No. 0816026.9, dated Nov. 10, 2010.
Lee, C. et., al. "UWB Communication and Networking Systems with Chaotic Oscillator for Low Rate WPAN", 8th International Conference on Advanced Communication Technology, Feb. 2006, pp. 867-870.
Kyarginsky, B. E. et., al. "Wideband Microwave Oscillators", 1st IEEE International Conference on Circuits and Systems for Communication, 2002, pp. 296-299.

* cited by examiner

*Primary Examiner* — Lee Nguyen
(74) *Attorney, Agent, or Firm* — Sughrue Mion, PLLC

(57) ABSTRACT

A radio frequency (RF) communication system having a chaotic signal generator and a method of generating a chaotic signal. The RF communication system includes a chaotic signal generator which generates a chaotic signal having a plurality of frequency components at a predetermined frequency band, a modulator which generates a chaotic carrier by combining the chaotic signal with a data signal which indicates information, and a transmission circuit which includes an antenna to transmit the chaotic carrier made at the modulator. The frequency signal generator comprises an oscillator which converts a DC bias power into a high frequency power, and a resonating unit which generates a wideband signal having a plurality of frequency components by passing a predetermined frequency band of the high frequency power signal.

39 Claims, 10 Drawing Sheets

RF COMMUNICATION SYSTEM HAVING A CHAOTIC SIGNAL GENERATOR AND METHOD FOR GENERATING CHAOTIC SIGNAL

CROSS-REFERENCE TO RELATED APPLICATIONS

This application claims priority from Korean Patent Application No. 10-2006-0018210, filed Feb. 24, 2006, in the Korean Intellectual Property Office, the disclosure of which is incorporated herein by reference.

BACKGROUND OF THE INVENTION

1. Field of the Invention

Systems and methods consistent with the present invention generally relate to a radio frequency (RF) communication system having a chaotic signal generator and a method of generating a chaotic signal, and more particularly, to an RF communication system having a chaotic signal generator which is less power-consuming, small in size and easy to construct and a method of generating a chaotic signal.

2. Description of the Related Art

A spread-spectrum communications technique transmits signal using a much wider band than the bandwidth of the signal. A representative example of using this technique is a code division multiple access (CDMA) which uses narrowband carriers. Additionally, there also is a way of using wideband carriers.

In order to use narrowband carriers, frequency of the data for transmission is modulated to be narrower than the frequency band of the carrier signal, while the frequency band of the data for transmission is modulated to be wider than the frequency band of the carrier signal in order to use wideband carriers.

Carriers in the spread-spectrum communications usually use sinuous waves and pulses. The sinuous waves or pulses are up-converted to a certain frequency to transmit data. To this end, a transmitter of a communication system needs components for up-converting the carriers from a baseband to a certain frequency band, while a receiver needs components to down-convert the received carriers back to the baseband.

More specifically, the transmitter includes a voltage controller oscillator (VCO) to generate a frequency to transmit data, and a phase locked loop (PLL) to lock the generated frequency from external influence. The transmitter also requires an up-mixer to up-convert the baseband carriers at the frequency generated by the VCO.

Accordingly, the receiver requires a down-mixer to down-convert the received carriers back to baseband.

Because the transmitter has components such as VCO, PLL, and up-mixer, power consumption increases. Additionally, components such an up-mixer is quite large and therefore, the size of the transmitter also increases. Likewise, there usually is a big and power-consuming receiver as the receiver uses components such as a down-mixer.

IEEE 802.15.4a standard has proposed the use of chaotic signals to transmit data.

IEEE 802.15.4a is the Task Group for the standardization of low-rate navigation sensor network, which proposed a next-generation communication incorporating a hybrid of IEEE 802.15.4 ZigBee and IEEE 802.15.3 Ultra Wide Band (UWB) communications with the functions of navigation and low-rate power consumption.

The chaotic signal modulation has been proposed in an attempt to achieve low-rate power consumption. The chaotic signal modulation can be designed in a simple RF structure at the hardware level, and circuits, which are generally required for an RF communication system such as VCO, PLL and mixer, are not necessary. Accordingly, power consumption can be reduced to 5 mW one-third of general power consumption, by using the chaotic signal modulation.

Therefore, a low-rate RF communication system will be achieved, if a chaotic signal modulation is appropriately applied.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a low-rate RF communication system having a chaotic signal generator, and a method of generating chaotic signal.

According to one aspect of the present invention, the present invention provides an RF communication system comprising: a chaotic signal generator which generates a chaotic signal having a plurality of frequency components at a predetermined frequency band; a modulator which generates a chaotic carrier by combining the chaotic signal with a data signal which indicates information; and a transmission circuit which includes an antenna to transmit the chaotic carrier made at the modulator.

The chaotic signal generator may comprise an oscillator which converts a direct current (DC) bias power into a high frequency power, and a resonating unit which generates a wideband signal having a plurality of frequency components by passing a predetermined frequency band of the high frequency power signal.

The resonating unit may comprise a first filter which receives the high frequency power from the oscillator and passes at least a part of a harmonic signal of the high frequency power; and a second filter which generates a wideband signal having a plurality of frequency components of a predetermined range of frequency band by oscillating the filtered signal, and provides the oscillator with the wideband signal.

The oscillator may comprise a nonlinear element, and high frequency power of the nonlinear element is determined by:

$$f(z) = M\left[|z + e_1| - |z' - e_1| + \frac{|z - e_2| - |z + e_2|}{2}\right]$$

where, M is an amplifier constant of the nonlinear element, and $e_1$, $e_2$ are constants.

The nonlinear element comprises one of a transistor and a diode.

The signal generator may be oscillated when the conditions are met that the phase of a signal passing a loop of the nonlinear element, the first filter and the second filter is a multiple of $2\pi$.

The signal generator may be oscillated when the conditions are met that a total gain of the loop is larger than 1.

The signal outputted from the first filter may be determined by:

$$Tx_1' + x_1 = f(z_N)$$

where, $f(z_N)$ is the function of high frequency output from the nonlinear element, T is a time constant of the first filter, and $x_1$ is the initial signal outputted from the first filter.

The first filter may comprise a low pass filter (LPF), and the first filter may be a primary filter.

The second filter may comprise at least one band pass filter (BPF), and the BPF may preferably be a secondary filter.

A (N)th output from the BPF may be determined by:

$$z_N'' + \alpha_{BN} z_N' + \omega_{BN}^2 z_N = \omega_{BN}^2 z_{N-1}$$

where, $z_{N-1}$ is an output from the (N−1)th BPF, that is, an input to the (N)th BPF, $\alpha_{BN}$ is an attenuation constant, $\omega_{BN}$ is a resonating frequency and $z_N$ is an output from the (N)th BPF.

The BPF may determine a resonating frequency band of the chaotic signal generator.

The second filter may comprise at least one LPF, and the LPF of the second filter may be a secondary filter.

The LPF of the second filter may be disposed between the first filter and the BPF.

An output from the (M)th LPF of the second filter may be determined by:

$$y_M'' + \alpha_{LM} y_M' + \omega_{LM}^2 y_M = \omega_{LM}^2 y_{M-1}$$

where, $y_{M-1}$ is an output from the (M−1)th LPF, that is, an input to the (M)th LPF, $\alpha_{LM}$ is an attenuation constant, $\omega_{LM}$ is a resonating frequency, and $y_M$ is an output from the (M)th LPF.

The LPF and the BPF of the second filter may have different delayed phase widths and gains, respectively.

The second filter may comprise a predetermined number of LPFs and BPFs so that a phase of a signal passing a loop of the nonlinear element, the first filter and the second filter corresponds to a multiple of $2\pi$.

According to an aspect of the present invention, an RF communication system may be provided, comprising a nonlinear element which converts a DC bias power into a high frequency power; a first LPF which filters the high frequency power into a predetermined frequency band; one or more second LPFs which shift the filtered high frequency power according to a predetermined phase width; and one or more BPFs which have difference phase widths than the second LPFs, and filter the shifted signal into a predetermined frequency band.

The BPF may comprise first to third BPFs.

According to another aspect of the present invention an RF communication system may be provided, comprising an oscillator which converts a DC bias power into a high frequency power; and a resonating unit which generates a wideband signal having a plurality of frequency components by passing a predetermined frequency band of the high frequency power signal.

According to yet another aspect of the present invention, and RF communication system may be provided, comprising: a nonlinear element which converts a DC bias power into a high frequency power; a first filter which receives a high frequency power from the nonlinear element and passes at least a part of a harmonic signal of the high frequency power; and a second filter comprising one or more LPFs and one or more BPFs, which generate a wideband signal having a plurality of frequency components in a predetermined range of frequency band by oscillating a signal from the first filter, and provide the nonlinear element with the wideband signal.

According to yet another aspect of the present invention, a method of generating a chaotic signal in an RF communication system, comprising: converting a DC bias power into a high frequency power; generating an initial signal which meets initial conditions for oscillation using the high frequency power; and generating a wideband signal having a plurality of frequency components in a predetermined range of frequency band by oscillating the initial signal.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
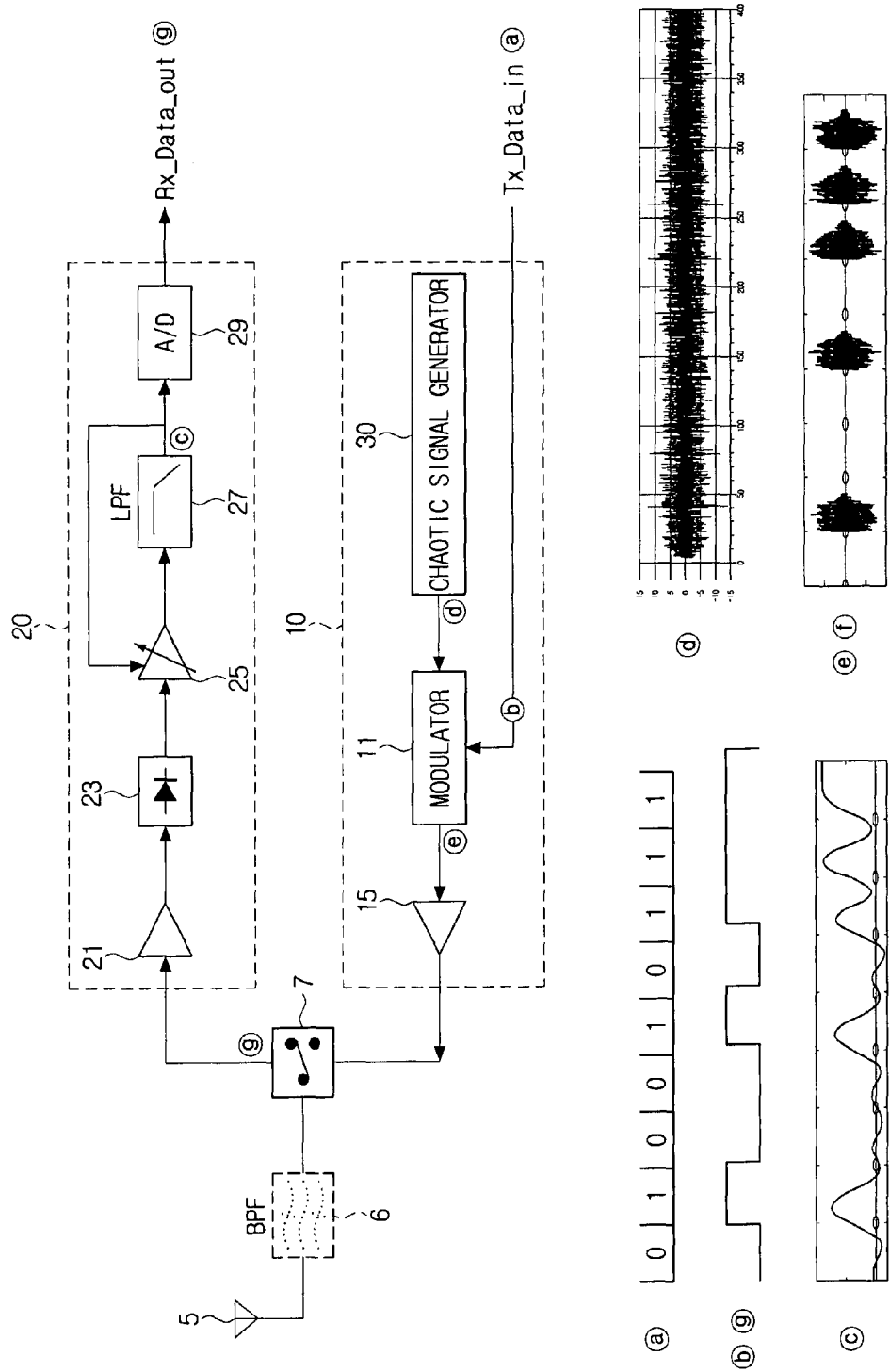
FIG. 1 shows a block diagram of a transceiver of a RF communication system using chaotic signal, and graphical representations of signal waves in respective domains of the RF communication system.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

The matters defined in the description such as the detailed construction and elements are provided to assist in a comprehensive understanding of the invention. Thus, it would be apparent to one skilled in the art that the present invention can be practiced out without those defined matters. Also, wellknown functions or constructions are not described in detail since they would obscure the invention with unnecessary detail.

The present invention particularly relates to the structure and operational principle of a RF communication system using a chaotic signal, and a chaotic signal generator to generate the chaotic signal.

The 'chaotic signal' particularly refers to a carrier used in the transmission of data signal between a transceiver, and the chaotic signal is directly generated in the frequency band for data signal transmission.

FIG. 1 shows a block diagram of a transceiver of a RF communication system using a chaotic signal, along with the waves at points (a) to (g).

The transceiver of a RF communication system may include a transmission circuit 10 which transmits a chaotic carrier which is obtained by modulating a chaotic signal and data signal, and a reception circuit 20 which receives the chaotic carrier and evaluates the data signal. The transceiver may also include a transmission/reception antenna 5, a switch 7 which connects one of the transmission circuit 10 and the reception circuit 20 to the antenna 5, and a band pass filter (BPF) 6 which filters the transmitted or received chaotic carrier.

The transmission circuit 10 may include a chaotic signal generator 30, a modulator 11, and a power amplifier 15.

Figure 2A:
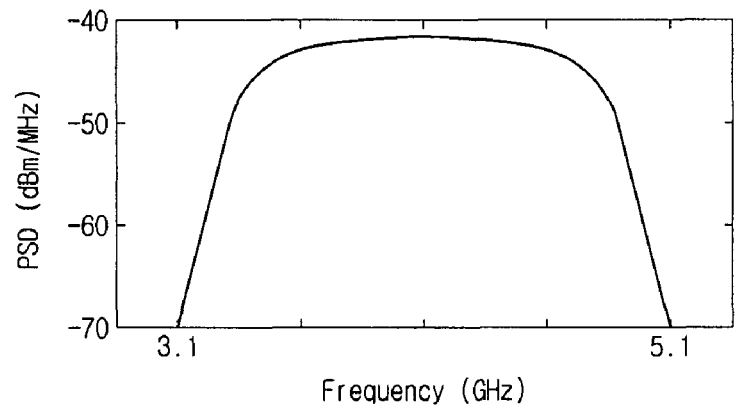
FIG. 2A shows, in enlargement, waves of chaotic signals generated from a chaotic signal generator of FIG. 1.
Figure 2B:
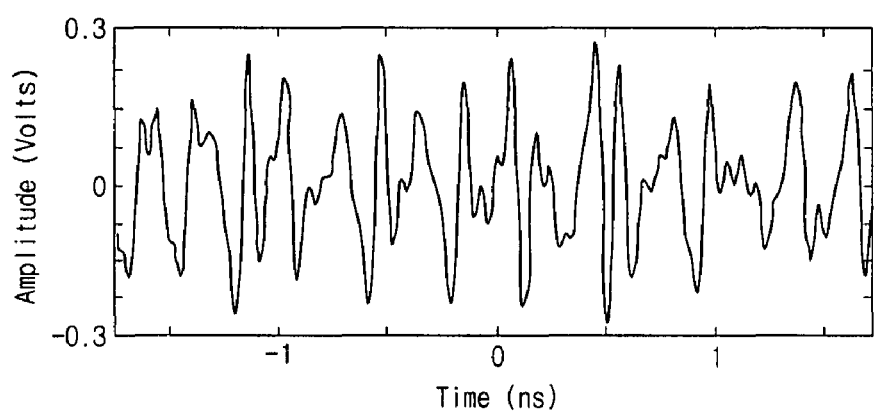
FIG. 2B shows a graphical representation showing the chaotic signal of FIG. 2A based on frequency domain.
Figure 2C:
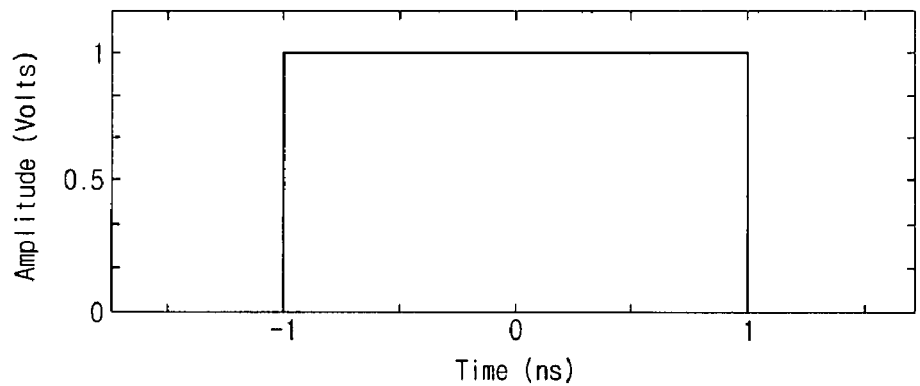
FIG. 2C is a graphical representation of an enlarged data signal.

The chaotic signal generator 30 may generate a chaotic signal which has a plurality of frequency components in a predetermined frequency band. With reference to point (d) of FIG. 1, the chaotic signal is generated as a plurality of pulses with different periods and amplitudes in the time domain are successively generated. FIG. 2A shows an enlarged chaotic signal at point (d) of FIG. 1. Based on the frequency domain, the chaotic signal is spread widely along the predetermined frequency band as show in FIG. 2B. The frequency band for the chaotic signal may vary according to the design of the chaotic signal generator 30, and FIG. 2B shows the chaotic signal spreading along the UWB from about 3.1 GHz to about 5.1 GHz.

Figure 3:
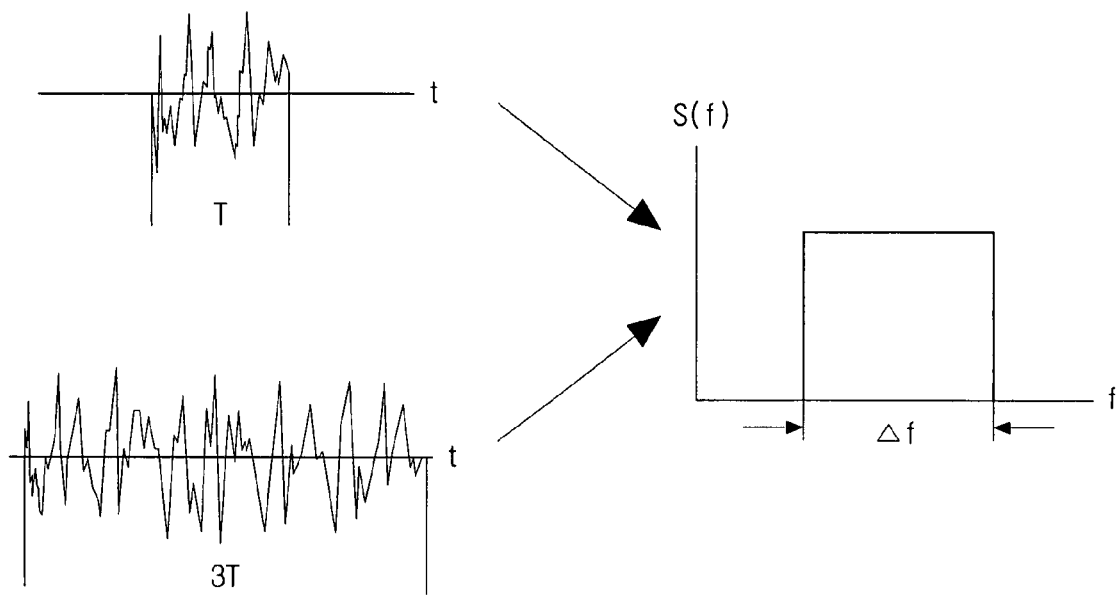
FIG. 3 is a graphical representation of a frequency bandwidth of a chaotic signal region 1 T and a pulse region 3 T.

The frequency band of the chaotic signal is determined by the frequency bandwidth of the chaotic signal which is generated from the chaotic signal generator 30, and is not related with the pulse region T of the chaotic signal. As shown in FIG. 3, the frequency bandwidth Δf is almost identical as the wideband property of the carrier, either when the pulse region of the chaotic signal is 1 T or when it is 3 T. Because the same frequency bandwidth can be maintained irrespective of the variance of pulse region of the chaotic signal, there is no need for additional components such as filter or amplifier to change the pulse region. Furthermore, even the carrier of stronger energy can be transmitted and received by changing the pulse region of the chaotic signal. Accordingly, the communication range can be adequately controlled without having to change the peak of the transmission power, by increasing or decreasing the pulse region of the chaotic signal.

The structure of the chaotic signal generator 30 will be explained in detail below, with reference to FIG. 4.

Figure 2D:
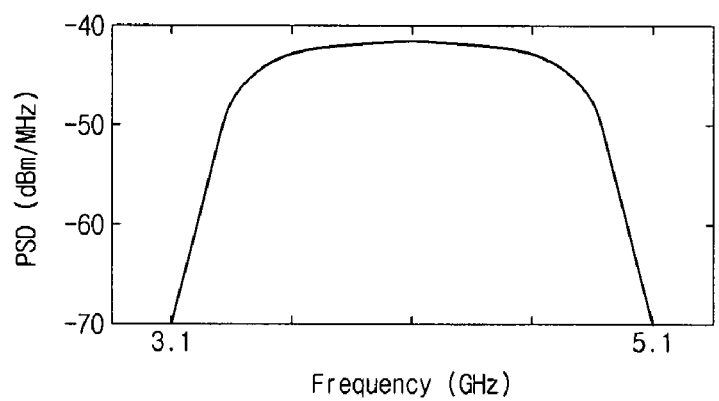
FIG. 2D shows a graphical representation of chaotic carrier by modulating the chaotic signal of FIG. 2A and the data signal of FIG. 2C.
Figure 2E:
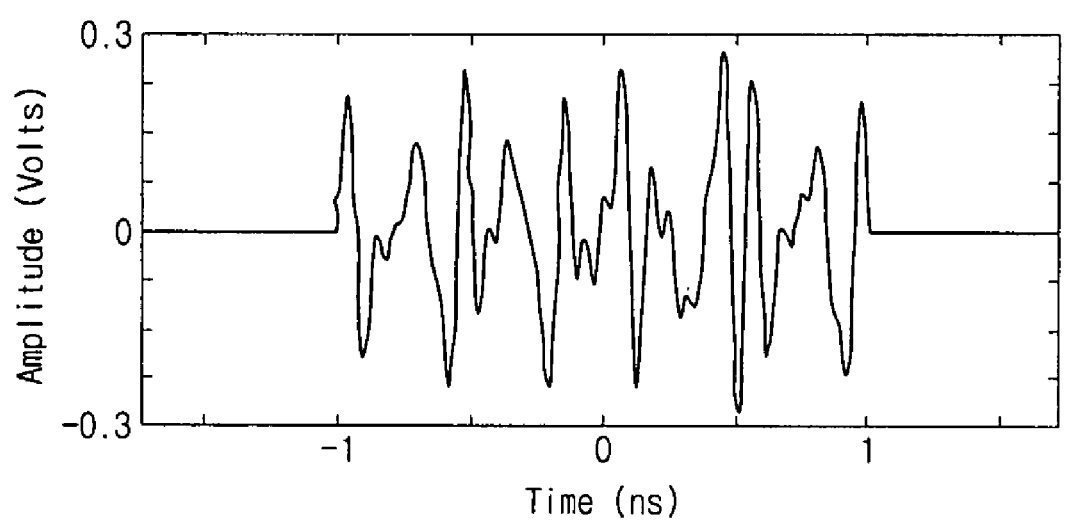
FIG. 2E is a graphical representation of the chaotic carrier of FIG. 2D based on frequency domain.

The modulator 11 generates a chaotic carrier by combining a chaotic signal from the chaotic signal generator 30 with a data signal. With reference to point (a) of FIG. 1, '0s' and '1s' of binary data bits are provided to the modulator 11 in the form of pulse. By combining the data signal with the chaotic signal, a chaotic carrier, which has a chaotic signal only in the information region of the data signal, is generated (see point (e) of FIG. 1). FIG. 2D is a graphical representation showing an enlarged part of the chaotic carrier at point (e) of FIG. 1. After the modulation, the frequency band of the chaotic carrier (see FIG. 2E) is same as that of the chaotic signal (see FIG. 2B). In other words, there is no relation between the pulse region of the chaotic signal and the frequency bandwidth.

The reception circuit 20 may include a low noise amplifier (LNA) 21, a detector 23, an automatic gain control (AGC) amplifier 25, a LPF 27, and an analogue-to-digital (A/D) converter 29.

The LNA 21 may amplify the chaotic carrier which is received over the antenna 5, and transmits the amplified signal to the detector 23.

The detector 23 detects the chaotic carrier and extracts a data signal. The detector 23 may include a diode, and as the chaotic carrier passes the detector 23, the chaotic carrier forms curvy signal waves as shown in the graphical representation of point (c) of FIG. 1.

The AGC amplifier 25 may increase or decrease the rate of amplification, and amplifies the signal waves extracted by the detector 23 to a predetermined level. The LPF 27 may filter the amplified signal waves so that the waves can be converted into digital signal at the A/D converter 29.

The A/D converter 29 converts the signal waves into digital signal, and therefore, extracts a data signal of pulse form as shown in FIG. 2B.

Figure 4:
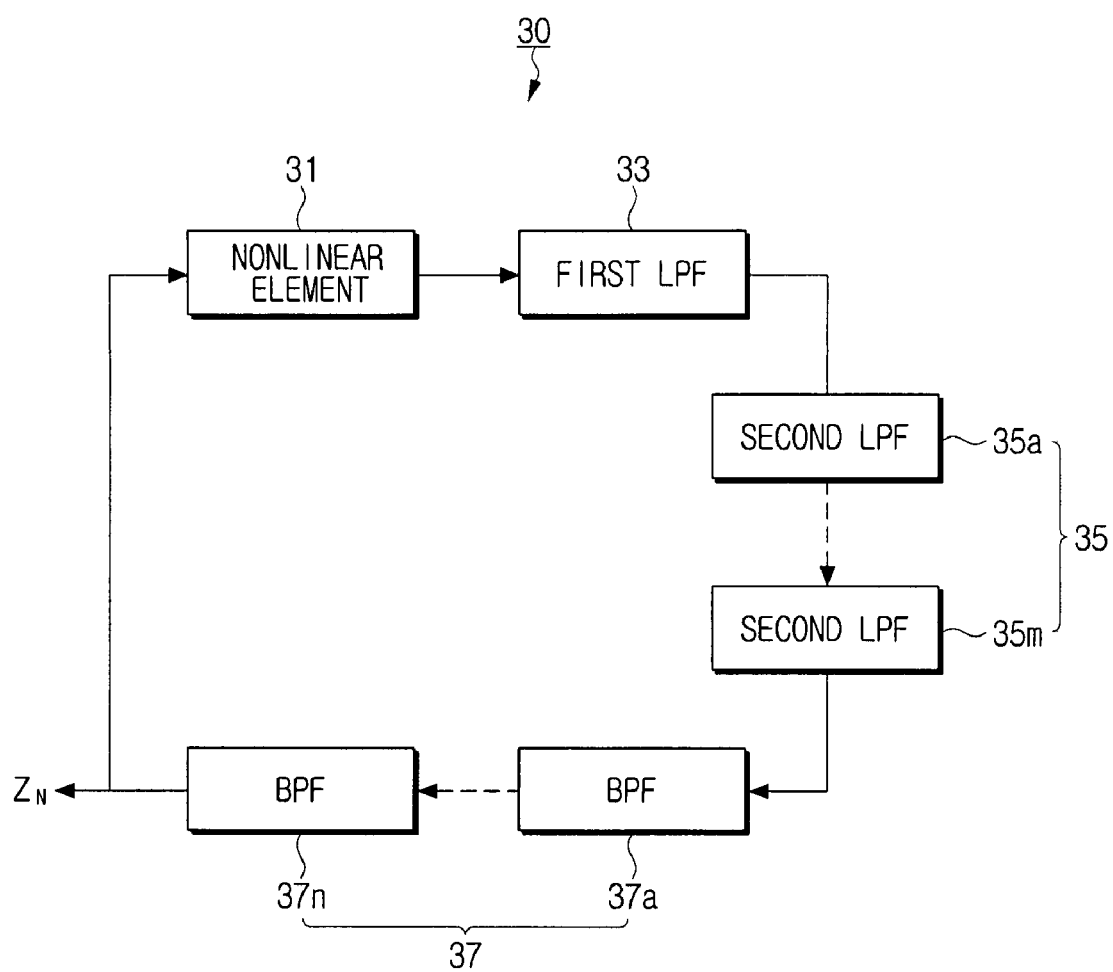
FIG. 4 is a block diagram of a chaotic signal generator according to an exemplary embodiment of the present invention.

FIG. 4 is a block diagram of a chaotic signal generator of the RF communication system of FIG. 1.

The chaotic signal generator 30 may include a loop of a nonlinear element 31, a first filter 33 and one or more filters 35, 37.

The nonlinear element 31 is a main part of an oscillator and operates to amplify an input signal of small power to an output signal of high power. The output function f(z) of the nonlinear element 31 may be expressed by Equation 1 as follows:

$$f(z) = M\left[|z+e_1| - |z-e_1| + \frac{|z-e_2| - |z+e_2|}{2}\right] \quad (1)$$

where, M is an amplifier constant of the nonlinear element 31, and $e_1$, $e_2$ are constants.

A transistor or a diode may be used as the nonlinear element 31. When the transistor is used, for example, a DC bias power to operate the transistor is converted to high frequency power, thereby resulting in amplification. The nonlinear element 31 of the chaotic signal generator 30 amplifies the noise inside the loop, and the amplified signal circulates along the loop and inputted back to the nonlinear element 31. As the above process repeats, stable chaotic signal is outputted.

The first filter 33 receives high frequency power signal from the nonlinear element 31, and processes the received high frequency power signal so that oscillation can occur. When a high frequency power signal is generated by amplifying a noise of the nonlinear element 31, the high frequency power signal usually contains not only the frequency selected during the design process, but also a harmonic ingredient which is multiple times larger than the selected frequency. The first filter 33 may select from the high frequency power signal the range of harmonic ingredient to be used for the oscillation. That is, the first filter 33 may also operate to limit the frequency band of the chaotic signal, by selecting the frequency range to be used for the oscillation.

The first filter 33 may be a LPF. This will be explained below as one example of the present invention, and the first filter 33 will be referred to as the first LPF 33. The first LPF 33 may be a primary filter, and the relation between the input and output of the first LPF 33 may be expressed by Equation 2 as follows:

$$Tx_1' + x_1 = f(z_N) \quad (2)$$

where, $f(z_N)$ is the function of high frequency output from the nonlinear element 31, that is, the function of signal inputted to the first LPF 33, T is a time constant of the first LPF 33, and $x_1$ is the initial signal outputted from the first LPF 33.

The chaotic signal generator 30 has to meet the following two conditions as other general ring oscillators do. First, the signal passing the entire loop of the nonlinear element 31, the first filter 33 and the second filter 35, 37 should have a phase variance of 360 degrees, which is a multiple of $2\pi$. Second, the gain of the entire loop should be greater than '1'. Both the first and the second filters 33, 35, 37 should meet the above conditions.

The second filter 35, 37 may include a plurality of second LPFs 35 and a plurality of BPFs 37, and like a resonator of the ring oscillator, the second filter 35, 37 operates to determine the bandwidth of the resonating frequency. The only difference is that while the resonator selects and resonates one frequency, the second LPFs 35 and the BPFs 37 of the chaotic signal generator 30 cause a plurality of frequency components to be selected by passing the frequency of certain bandwidths. The BPFs 37 operate to determine resonating frequency band to generate a chaotic signal in the desired frequency band, and the second LPFs 35, rather than determining the resonating frequency band, operate to enable oscillation by causing the signal passing the loop to have a phrase variance as a multiple of $2\pi$ in cooperation with the BPFs 37.

The second LPFs 35 and the BPFs 37 are secondary filters, which have higher phase variance and larger and higher loop gains than the primary filters. Accordingly, the first LPF 33 may be employed as the primary filter, and the second LPFs 35 and the BPFs 37 may be employed as the secondary filters. By using the primary and the secondary filters appropriately, various frequency components can be selected. Additionally, because the second LPFs 35 and the BPFs 37 have different phase variances, and the respective frequency components vary phase differently, a wider frequency band is obtained.

In one example, the second filters 35, 37 may include M number of second LPFs 35. In this example, the first one 35a of the second LPFs 35 receives input from the first LPF 33. The relation between the input and output of the first one 35a of the second LPFs 35 may be expressed by Equation 3 as follows:

$$y_1'' + \alpha_{L1} y_1' + \omega_{L1}^2 y_1 = \omega_{L1}^2 x_1 \quad (3)$$

where, $x_1$ is an output from the first LPF 33, that is, input to the first one 35a of the second LPFs 35, $\alpha_{L1}$ is an attenuation constant, $\omega_{L1}$ is a resonating frequency, and $y_1$ is an output from the first one 35a of the second LPFs 35.

The relation between the input and output of the (M)th LPF 35m of the second LPFs 35 may be expressed by Equation 4 as follows:

$$y_M'' + \alpha_{LM} y_M' + \omega_{LM}^2 y_M = \omega_{LM}^2 y_{M-1} \quad (4)$$

where, $y_{M-1}$ is an output from the (M−1)th LPF of the second LPFs 35, that is, an input to the (M)th LPF 35m, and $y_M$ is an output from the (M)th LPF.

In another example, the second filters 35, 37 may include (n) number of BPFs 37. In this example, the first BPF 37a receives a signal outputted from the (M)th LPF 35m of the second LPFs 35, and the relation between the input and output of the first BPF 37a may be expressed by Equation 5 as follows:

$$z_1'' + \alpha_{B1} z_1' + \omega_{B1}^2 z_1 = \omega_{B1}^2 y_M' \quad (5)$$

where, $y_M$ is an output from the (M)th LPF 35m of the second LPFs, that is, an input to the first BPF 37a, $\alpha_{B1}$ is an attenuation constant, $\omega_{B1}$ is a resonating frequency, and $z_1$ is an output from the first BPF 37a.

The relation between the input and output of the (N)th BPF 37n may be expressed by Equation 6 as follows:

$$z_N'' + \alpha_{BN} z_N' + \omega_{BN}^2 z_N = \omega_{BN}^2 z_{N-1}' \quad (6)$$

where, $z_{N-1}$ is an output from the (N−1)th BPF, that is, an input to the (N)th BPF 37n, and $z_N$ is an output from the (N)th BPF 37n.

The output signal from the BPFs 37 is inputted back to the nonlinear element 31, and circulates along the loop of the first LPF 33, the second LPFs 35 and the BPFs 374 of the nonlinear element 31 to finally become stable chaotic signal.

Figure 5:
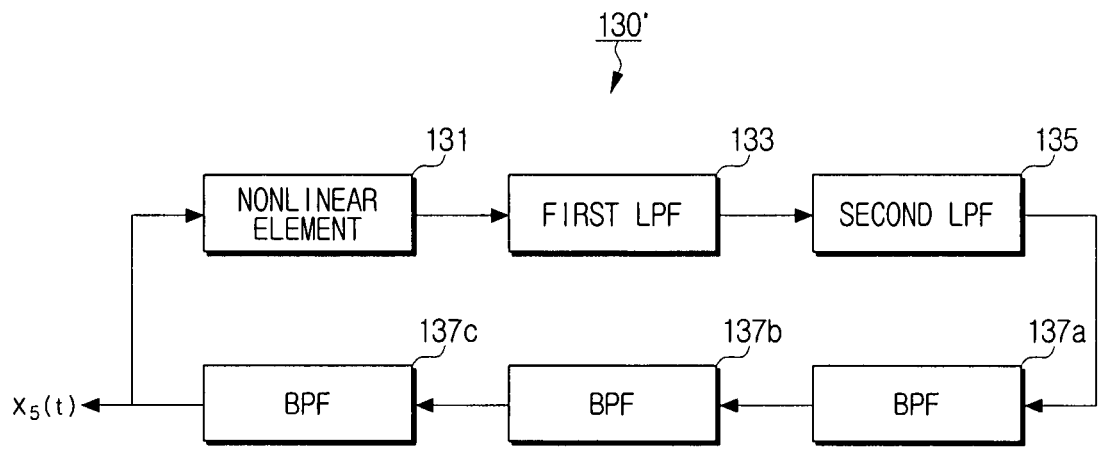
FIG. 5 is a block diagram of a chaotic signal generator according to an exemplary embodiment of the present invention.

FIG. 5 is a block diagram of a chaotic signal generator according to an exemplary embodiment of the present invention. As shown, the chaotic signal generator according to one exemplary embodiment may include a nonlinear element 131, a first LPF 133, a second LPF 135, and three BPFs 137a, 137b, 137c.

The nonlinear element 131 amplifies a DC bias power to high frequency power, and the first LPF 133 filters the high frequency signal in the base band.

The resonating frequency band is determined when the high frequency signal filtered at the base band passes through the second LPF 135 and the three BPFs 137a, 137b, 137c. When the resonating frequency band is determined, the signal is inputted back to the nonlinear element 131, and processed repeatedly to become a chaotic signal having a plurality of frequency components.

Figure 6:
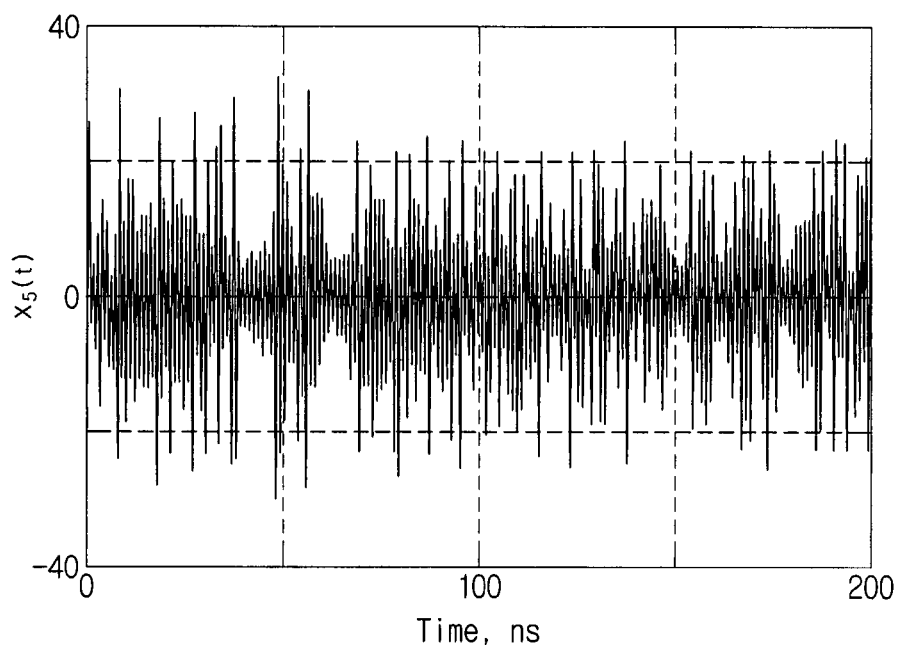
FIG. 6 is a graphical representation of chaotic signal generated from the chaotic signal generator based on the time domain.

The chaotic signal generated by the chaotic signal generator 130 shows a series of pulses of different amplitudes and periods in time domain (see FIG. 6).

Figure 7:
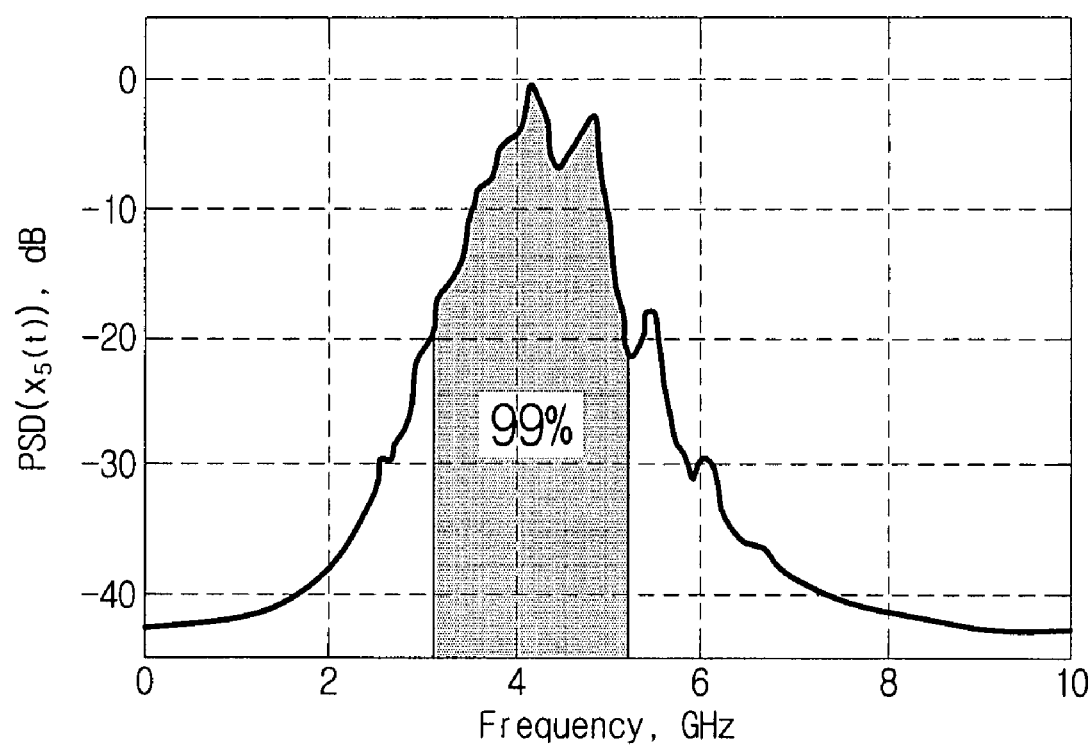
FIG. 7 is a graphical representation of the result of measuring power spectrum density of chaotic signal according to an exemplary embodiment of the present invention.

FIG. 7 shows in a graphical representation the result of measuring a power spectrum density of the chaotic signal according to an exemplary embodiment of the present invention.

With reference to FIG. 7, 99% of power of the power spectrum is focused around −20 dB, which means high energy rate and low power consumption.

Figure 8A:
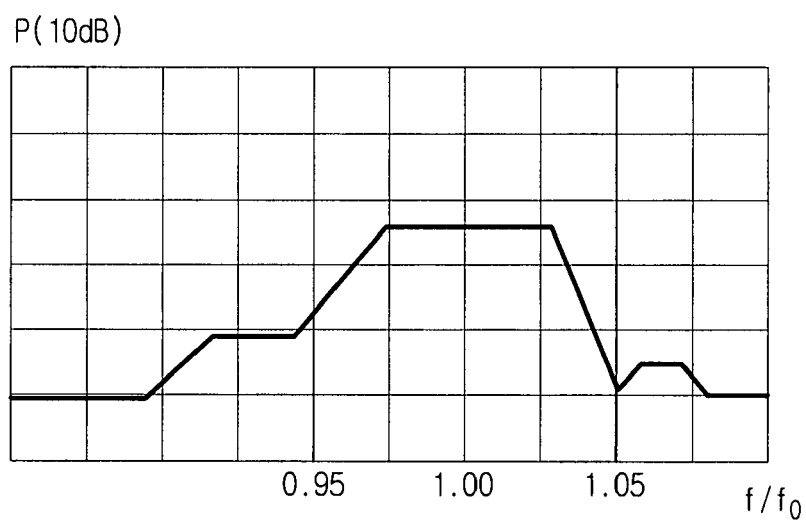
FIG. 8A is a graphical representation of an example of a signal mask defined by the Federal Communications Commission (FCC)
Figure 8B:
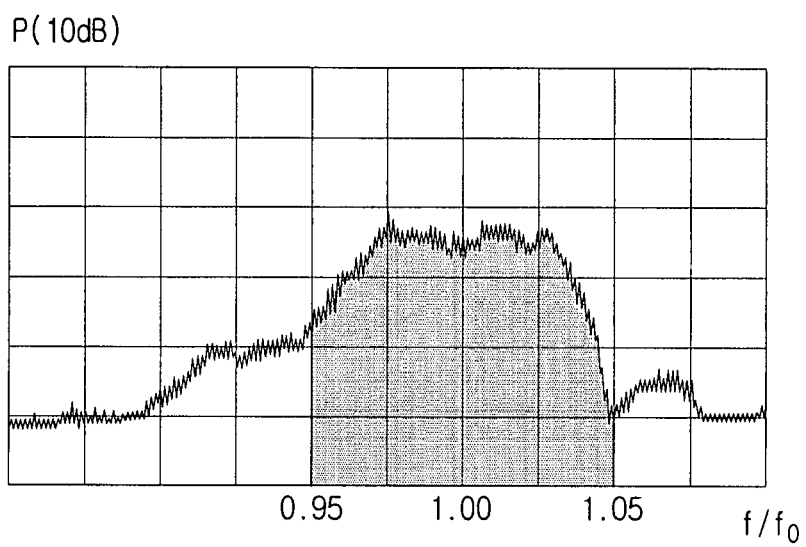
FIG. 8B shows a power spectrum of chaotic signal generated by a chaotic signal generator based on the mask of FIG. 8A.

FIG. 8A is a graphical representation of an example of a signal mask defined by the FCC, and FIG. 8B shows a power spectrum of chaotic signal generated by a chaotic signal generator based on the mask of FIG. 8A. As shown, the power spectrum of the chaotic signal from the chaotic signal generator 130 almost matches the FCC signal mask.

Figure 9A:
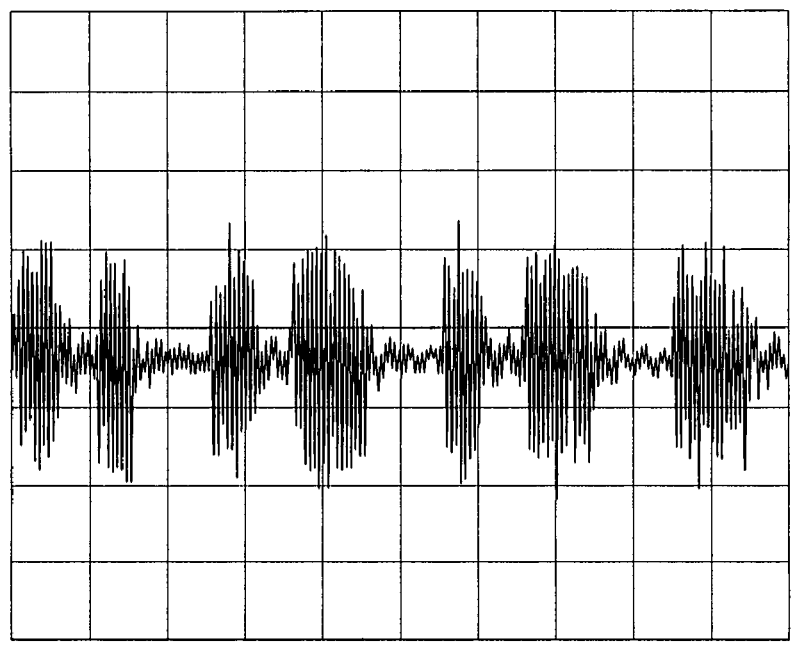
FIG. 9A is a graphical representation of time domain of chaotic carrier which combines the chaotic signal of FIG. 6 with the data signal.
Figure 9B:
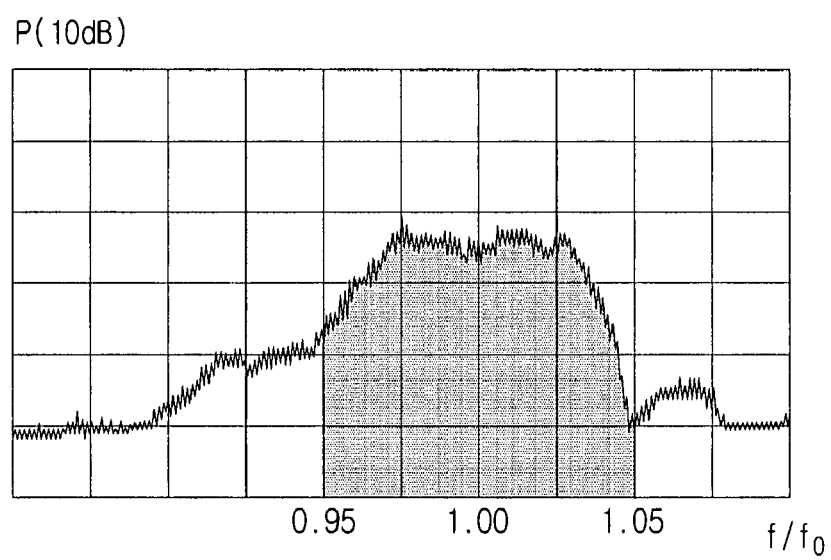
FIG. 9B is a power spectrum of chaotic carrier of FIG. 9A.

FIG. 9A is a graphical representation of time domain of chaotic carrier which combines the chaotic signal of FIG. 6 with the data signal, and FIG. 9B is a power spectrum of chaotic carrier of FIG. 9A.

While the chaotic signal of FIG. 6 is successively formed in time domain, the chaotic carrier of FIG. 9A shows a chaotic signal appearing and disappearing according to the data signal. Both of FIGS. 8B and 9B show almost no difference of power spectrum between before and after the chaotic signal is combined with the data signal.

Because there is almost no change in the power spectrum by the fact that the data signal is combined, or not combined with the chaotic signal, most of the RF communication system can still be utilized after the combination of signals.

As explained above, according to the exemplary embodiments of the present invention, a transmission circuit of an RF communication system does not need to use additional components such as VCO, PLL and up-mixer, and a reception circuit also does not need to employ components such as down-mixer. Additionally, a diode may be used as a detector in constructing a wideband RF communication system. Because the power consumption can be greatly reduced, a low rate RF communication system can be provided, and the size of the RF communication system is also reduced. Additionally, price can be reduced, and RF communication system becomes easy to construct. Also importantly, a power efficiency is high because the chaotic signal generator has 99% of power spectrum around −20 dB within the FCC standard mask.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A radio frequency (RF) communication system comprising:
a chaotic signal generator which generates a chaotic signal having a plurality of frequency components at a predetermined frequency band;
a modulator which generates a chaotic carrier by combining the chaotic signal with a data signal; and
a transmission circuit comprising an antenna to transmit the chaotic carrier generated by the modulator,
wherein the chaotic signal generator comprises an oscillator which converts a direct current (DC) bias power into the high frequency power, and a resonating unit which generates a wideband signal having a plurality of frequency components by passing the predetermined frequency band of the high frequency power signal, and
wherein the resonating unit comprises:
a first filter which receives the high frequency power from the oscillator and passes at least a part of a harmonic signal of the high frequency power as a filtered signal; and
a second filter which generates the wideband signal having the plurality of frequency components of the predetermined range of frequency band by oscillating the filtered signal, and provides the oscillator with the wideband signal.

2. The RF communication system of claim 1, wherein the oscillator comprises a nonlinear element, and high frequency power of the nonlinear element is determined by:

$$f(z) = M\left[|z+e_1| - |z-e_1| + \frac{|z-e_2|-|z+e_2|}{2}\right]$$

wherein, M is an amplifier constant of the nonlinear element, and $e_1$, $e_2$ are constants.

3. The RF communication system of claim 2, wherein the nonlinear element comprises one of a transistor and a diode.

4. The RF communication system of claim 3, wherein the chaotic signal generator enables oscillation if a phase variance of a signal passing a loop of the nonlinear element, the first filter and the second filter is a multiple of $2\pi$.

5. The RF communication system of claim 4, wherein the chaotic signal generator additionally enables the oscillation if a total gain of the loop is larger than 1.

6. The RF communication system of claim 1, wherein the signal outputted from the first filter is determined by:

$$Tx_1' + x_1 = f(z_N)$$

wherein, $f(z_N)$ is a function of high frequency output from the oscillator, T is a time constant of the first filter, and $x_i$ is an initial signal outputted from the first filter.

7. The RF communication system of claim 6, wherein the first filter comprises a low pass filter (LPF).

8. The RF communication system of claim 7, wherein the first filter is a primary filter.

9. The RF communication system of claim 1, wherein the second filter comprises at least one band pass filter (BPF).

10. The RF communication system of claim 9, wherein the BPF is a secondary filter.

11. The RF communication system of claim 9, wherein the second filter comprises a plurality of N BPFs and an (N)th output from an (N)th BPF is determined by:

$$z_N'' + \alpha_{BN} z_N' + \omega_{BN}^2 z_N = \omega_{BN}^2 z_{N-1}'$$

wherein, $z_{N-1}$ is an output from an (N−1)th BPF, that is, an input to the (N)th BPF, $\alpha_{BN}$ is an attenuation constant, $\omega_{BN}$ is a resonating frequency and $z_N$ is an output from the (N)th BPF.

12. The RF communication system of claim 11, wherein the plurality of N BPFs determines a resonating frequency band of the chaotic signal generator.

13. The RF communication system of claim 1, wherein the second filter comprises at least one LPF.

14. The RF communication system of claim 13, wherein the LPF of the second filter is a secondary filter.

15. The RF communication system of claim 14, wherein the second filter further comprises a band pass filter (BPF) and the LPF of the second filter is disposed between the first filter and the BPF.

16. The RF communication system of claim 15, wherein the second filter comprises a plurality of M LPFs and an output from an (M)th LPF of the second filter is determined by:

$$y_M'' + \alpha_{LM} y_M' + \omega_{LM}^2 y_M = \omega_{LM}^2 y_{M-1}$$

wherein, $y_{M-1}$ is an output from an (M−1)th LPF, that is, an input to the (M)th LPF, $\alpha_{LM}$ is an attenuation constant, $\omega_{LM}$ is a resonating frequency, and $y_M$ is an output from the (M)th LPF.

17. The RF communication system of claim 16, wherein the plurality of M LPFs and the BPF of the second filter have different delayed phase widths and gains.

18. The RF communication system of claim 17, wherein the BPF is a predetermined number of BPFs so that a phase of a signal passing a loop of the oscillator, the first filter and the second filter corresponds to a multiple of $2\pi$.

19. A radio frequency (RF) communication system comprising:
a nonlinear element which converts a direct current (DC) bias power into a high frequency power;
a first low pass filter (LPF) which filters the high frequency power into a predetermined frequency band;
at least one second LPF which shifts the filtered high frequency power according to a predetermined phase width to generate a shifted signal; and
at least one band pass filter (BPF) which has a difference phase width than the at least one second LPF, and filter the shifted signal into a predetermined frequency band.

20. The RF communication system of claim 19, wherein the at least one BPF comprises a first BPF, a second BPF and a third BPF.

21. A radio frequency (RF) communication system comprising:
a nonlinear element which converts a direct current (DC) bias power into a high frequency power;
a first filter which receives the high frequency power from the nonlinear element and passes at least a part of a harmonic signal of the high frequency power; and
a second filter comprising at least one low pass filter (LPF) and at least one band pass filter (BPF), which generates a wideband signal having a plurality of frequency components in a predetermined range of frequency band by oscillating a signal from the first filter, and provides the nonlinear element with the wideband signal.

22. A radio frequency (RF) communication system comprising:
a nonlinear element which converts a direct current (DC) bias power into a high frequency power;
a first filter which receives the high frequency power from the nonlinear element and passes at least a part of a harmonic signal of the high frequency power; and
at least one second filter which generates a wideband signal having a plurality of frequency components in a predetermined range of frequency band by oscillating a signal from the first filter, and provide the nonlinear element with the wideband signal.

23. A radio frequency (RF) communication system comprising:
a nonlinear element which converts a direct current (DC) bias power into a high frequency power;
a first filter which receives the high frequency power from the nonlinear element and passes at least a part of a harmonic signal of the high frequency power; and
a second filter comprising one or more LPFs and one or more BPFs which generates a wideband signal having a plurality of frequency components in a predetermined range of frequency band by oscillating a signal from the first filter, and provides the nonlinear element with the wideband signal.

24. A method of generating a chaotic signal in a radio frequency (RF) communication system, the method comprising:
converting a direct current (DC) bias power into a high frequency power;
generating an initial signal which meets initial conditions for oscillation using the high frequency power; and
generating a wideband signal having a plurality of frequency components in a predetermined range of frequency band by oscillating the initial signal,
wherein the high frequency power is generated by:

$$f(z) = M\left[|z+e_1| - |z-e_1| + \frac{|z-e_2|-|z+e_2|}{2}\right]$$

wherein, M is an amplifier constant of a nonlinear element, and $e_1$, $e_2$ are constants.

25. The method of claim 24, wherein the nonlinear element comprises a transistor.

26. A method of generating a chaotic signal in a radio frequency (RF) communication system, the method comprising:
converting a direct current (DC) bias power into a high frequency power;
generating an initial signal which meets initial conditions for oscillation using the high frequency power; and
generating a wideband signal having a plurality of frequency components in a predetermined range of frequency band by oscillating the initial signal,
wherein a loop is generated during the process of converting the DC bias power into the wideband signal and a phase of a signal passing the loop corresponds to a multiple of $2\pi$ in order for the oscillating to occur.

27. The method of claim 26, wherein a total gain of the loop is larger than 1 in order for the oscillating to occur.

28. A method of generating a chaotic signal in a radio frequency (RF) communication system, the method comprising:
converting a direct current (DC) bias power into a high frequency power;
generating an initial signal which meets initial conditions for oscillation using the high frequency power; and
generating a wideband signal having a plurality of frequency components in a predetermined range of frequency band by oscillating the initial signal,
wherein the initial signal is determined by:

$$Tx_1' + x_1 = f(z_N)$$

wherein, $f(z_N)$ is a function of high frequency output from a nonlinear element, T is a time constant of a first filter, and $x_1$ is an initial signal outputted from the first filter.

29. The method of claim 28, wherein the first filter comprises a low pass filter (LPF).

30. The method of claim 29, wherein the first filter is a primary filter.

31. The method of claim 28, further comprising a second filter which generates the wideband signal, wherein the second filter comprises at least one band pass filter (BPF).

32. The method of claim 31, wherein the BPF is a secondary filter.

33. The method of claim 31, wherein the second filter comprises a plurality of N BPFs and an (N)th output from the (N)th BPF is determined by:

$$z_N'' + \alpha_{BN} z_N' + \omega_{BN}^2 z_N = \omega_{BN}^2 z_{N-1}$$

wherein, $z_{N-1}$ is an output from an (N−1)th BPF, that is, an input to the (N)th BPF, $\alpha_{BN}$ is an attenuation constant, $\omega_{BN}$ is a resonating frequency and $z_N$ is an output from the (N)th BPF.

34. The method of claim 33, wherein the second filter comprises at least one LPF.

35. The method of claim 34, wherein the LPF of the second filter is a secondary filter.

36. The method of claim 35, wherein the LPF of the second filter is disposed between the first filter and the plurality of N BPFs.

37. The method of claim 36, wherein the second filter comprises a plurality of M LPFs and an output from an (M)th LPF of the second filter is determined by:

$$y_M'' + \alpha_{LM} y_M' + \omega_{LM}^2 y_M = \omega_{LM}^2 y_{M-1}$$

wherein, $y_{M-1}$ is an output from an (M−1)th LPF, that is, an input to the (M)th LPF, $\alpha_{LM}$ is an attenuation constant, $\omega_{LM}$ is a resonating frequency, and $y_M$ is an output from the (M)th LPF.

38. The method of claim 37, wherein the plurality of M LPFs and the plurality of N BPFs of the second filter have different delay phase widths and gains.

39. The method of claim 38, wherein N and M are predetermined numbers so that a phase of a signal passing a loop of the nonlinear element, the first filter and the second filter corresponds to a multiple of $2\pi$.

* * * * *